(12) United States Patent
Adams

(10) Patent No.: US 10,429,104 B2
(45) Date of Patent: *Oct. 1, 2019

(54) METHOD AND APPARATUS FOR ELECTRICITY GENERATION USING ELECTROMAGNETIC INDUCTION INCLUDING THERMAL TRANSFER BETWEEN VORTEX FLUX GENERATOR AND REFRIGERATOR COMPARTMENT

(71) Applicant: Silicon Turbine Systems, Inc., Cupertino, CA (US)

(72) Inventor: Richard Adams, Grass Valley, CA (US)

(73) Assignee: Silicon Turbine Systems, Inc., Campbell, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/818,433

(22) Filed: Nov. 20, 2017

(65) Prior Publication Data
US 2018/0202693 A1    Jul. 19, 2018

Related U.S. Application Data

(63) Continuation of application No. 13/640,683, filed as application No. PCT/US2011/031789 on Apr. 8, 2011, now Pat. No. 9,822,997.

(Continued)

(51) Int. Cl.
*F25B 21/00* (2006.01)
*H02N 11/00* (2006.01)

(52) U.S. Cl.
CPC ........... *F25B 21/00* (2013.01); *H02N 11/002* (2013.01); *Y02B 30/66* (2013.01)

(58) Field of Classification Search
CPC ........ F25B 21/00; H02N 11/002; Y02B 30/66
(Continued)

(56) References Cited

U.S. PATENT DOCUMENTS 3,119,236 A * 1/1964 Lutes ..................... F25B 21/00
    165/288
3,421,330 A * 1/1969 Otter, Jr. ................. F25B 21/00
    62/3.1

(Continued)

FOREIGN PATENT DOCUMENTS

CN         1210389 A  *  3/1999
JP         06141531 A  *  5/1994
(Continued)

*Primary Examiner* — Alex W Mok
(74) *Attorney, Agent, or Firm* — Toering Patents PLLC

(57) ABSTRACT

System and method for generating and storing electricity by electromagnetic induction using a magnetic field modulated by the formation, dissipation, and movement of vortices produced by a vortex material such as a type II superconductor and further including a vortex flux generator in cryostat and a refrigerant compartment having bi-directionally thermal transfer to the vortex flux generator are described. Magnetic field modulation occurs at the microscopic level, facilitating the production of high frequency electric power. Generator inductors are manufactured using microelectronic fabrication, in at least one dimension corresponding to the spacing of vortices. The vortex material fabrication method establishes the alignment of vortices and generator coils, permitting the electromagnetic induction of energy from many vortices into many coils simultaneously as a cumulative output of electricity. A thermoelectric cycle is used to convert heat energy into electricity.

14 Claims, 8 Drawing Sheets

Related U.S. Application Data

(60) Provisional application No. 61/323,293, filed on Apr. 12, 2010.

(58) Field of Classification Search
USPC .......................................................... 310/306
See application file for complete search history.

(56) References Cited

U.S. PATENT DOCUMENTS

| | | | | |
|---|---|---|---|---|
| 3,593,110 | A * | 7/1971 | Huebener | H01L 35/00 |
| | | | | 322/2 R |
| 3,765,186 | A * | 10/1973 | Vassilev | F25B 21/00 |
| | | | | 62/3.1 |
| 3,875,435 | A * | 4/1975 | Fletcher | H02K 55/00 |
| | | | | 310/10 |
| 4,292,579 | A * | 9/1981 | Constant | H01L 35/00 |
| | | | | 136/203 |
| 5,091,361 | A * | 2/1992 | Hed | F25B 21/00 |
| | | | | 257/E39.018 |
| 5,563,368 | A * | 10/1996 | Yamaguchi | H01L 37/00 |
| | | | | 136/200 |
| 9,822,997 | B2 * | 11/2017 | Adams | F25B 21/00 |
| 2006/0110260 | A1 * | 5/2006 | Hsu | H02K 44/08 |
| | | | | 417/48 |

FOREIGN PATENT DOCUMENTS

| | | | | | |
|---|---|---|---|---|---|
| JP | | 07274562 | A | * 10/1995 | |
| JP | | 08236369 | A | * 9/1996 | |
| WO | WO 2010038196 | A2 | * | 4/2010 | H02N 11/002 |

* cited by examiner

METHOD AND APPARATUS FOR ELECTRICITY GENERATION USING ELECTROMAGNETIC INDUCTION INCLUDING THERMAL TRANSFER BETWEEN VORTEX FLUX GENERATOR AND REFRIGERATOR COMPARTMENT

CROSS-REFERENCE TO RELATED APPLICATIONS

This Application is a continuation application of U.S. patent application Ser. No. 13/640,683, entitled "Method and Apparatus for Electricity Generation Using Electromagnetic Induction Including Thermal Transfer Between Vortex Flux Generator and Refrigerator Compartment," which was filed on Feb. 19, 2013, now granted as U.S. Pat. No. 9,822,997; which, in turn is a 371 National Phase application of International Application No. PCT/US2011/031789, entitled "Method and Apparatus for Electricity Generation Using Electromagnetic Induction Including Thermal Transfer Between Vortex Flux Generator and Refrigerator Compartment," which was filed on Apr. 8, 2011; which in turn claims priority to U.S. Provisional Application No. 61/323,293, filed Apr. 12, 2010, titled "Vortex Flux Refrigerator." Each of foregoing applications is incorporated by reference herein in its entirety.

TECHNICAL FIELD

The present invention relates to a method and apparatus for energy conversion. More specifically, the invention relates to a method and apparatus for cyclical conversion of an input energy source into the kinetic energy of a magnetic field modulated by vortices, and then into electric energy. Further, the disclosure relates to a method and apparatus for generating and storing electricity by electromagnetic induction including a vortex flux generator in cryostat and refrigerant compartment.

BACKGROUND

The second law of thermodynamics is an expression of the tendency that over time, differences in temperature, pressure, and chemical potential equilibrate in an isolated physical system. From the state of thermodynamic equilibrium, the second law declares the impossibility of machines that generate usable energy from the abundant internal energy of nature by processes called perpetual motion of the second kind.

The second law of thermodynamics applies in many specific ways, for example, in that any system involving measurable heat transfer has some irreversible energy loss to heat. Although there have been many experiments to prove exceptions to this general rule, no device yet exists that harnesses thermal energy and converts it into electricity without loss.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the various elements as drawn are not intended to convey any information regarding the actual shape of the particular elements, and have been solely selected for ease of recognition in the drawings.

DETAILED DESCRIPTION

Figure 1:
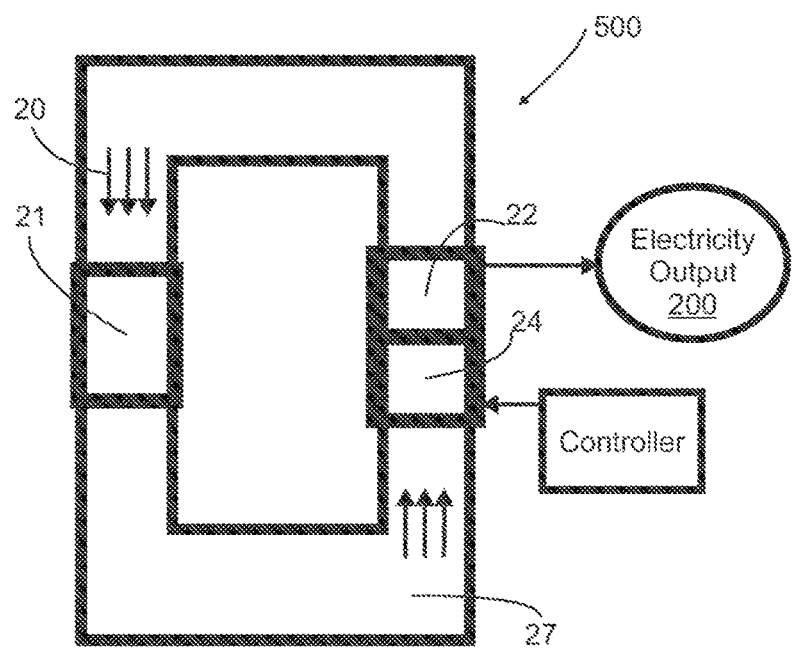
FIG. 1 shows a schematic view of a vortex flux generator in accordance with aspects of the disclosure.

In the following description, certain specific details are set forth in order to provide a thorough understanding of various embodiments of the invention. However, one skilled in the relevant art will recognize that the invention may be practiced without one or more of these specific details, or with other methods, components, materials, etc. In other instances, well-known structures associated with electromagnetic induction, vortices or magnetic fields have not been shown or described in detail to avoid unnecessarily obscuring descriptions of the embodiments of the invention.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For example, each specific element includes all technical equivalents that operate in a similar manner to accomplish a similar purpose. Unless the context requires otherwise, throughout the specification and claims which follow, the word "comprise" and variations thereof, such as, "comprises" and "comprising" are to be construed in an open, inclusive sense, which is as "including, but not limited to."

For purposes of further understanding the disclosure, the following terms are defined further below:

Electrical conductor: an assemblage of matter that forms a volume of material with the property of conducting electric current with low loss or no loss.

Diamagnetism: a property of matter where magnetic fields permeate with a reduced degree of penetration, or are repelled, defined here to clarify the definition of vortices used herein.

Vortex (when used, the plural "vortices" is also implied): matter forming a area, located within and/or adjacent to a vortex material, that has the characteristic of reduced diamagnetism within an area, relative to a comparatively increased diamagnetism outside an area. The area may include an additional dimension establishing a volume. The reduced diamagnetism allows a higher magnetic field density within a vortex, while the area surrounding the vortex has a relatively lower density of the magnetic field.

Vortices are formed by a set of conditions applied to a vortex material. For example, by placing a vortex material, that may include a superconductor material, in a magnetic field, and transferring heat energy out of the material, urging the material into the superconducting state, vortices form within and/or adjacent to the material. When a vortex forms, the magnetic field density inside the vortex increases, and since the field may include a total field in an area in which that field is conserved, the magnetic field surrounding the vortex is urged to decrease, such that the total conserved field, including the field inside and outside the vortex, remains the same.

Vortex material: an assemblage of matter within and/or adjacent to which a vortex can form. The vortex that forms may do so because of conditions comprised by the properties of the vortex material. An example vortex material is a superconductor material. The vortex material may include an assemblage of various materials that include both superconducting and non-superconducting materials, such that assemblage will produce a vortex. In additional to a material that forms vortices, the other matter assembled may include materials that have mechanical support, energy flow connections, insulation, and materials that urge an artificial means to predispose the location that a vortex will form.

The vortex material may be re-entrant, meaning that the vortex forms and subsequently dissipates in the vortex material, without any external stimulation. The vortex material may be non-re-entrant, meaning that that a vortex forms and/or dissipates only upon external stimulation. The vortex material may include materials that exhibit both re-entrant and non-re-entrant behavior. The vortex material may include materials that can be stimulated to form and dissipate vortices by a controller that transfers energy into and out of the vortex material.

The vortices that form may include predisposed dimensions that are determined by the properties of the assemblage of matter that forms the vortex material, and determined by the environmental conditions that the vortex material is operated in. By artificially compelling a plurality of vortices to form at predetermined locations, other vortices nearby will also form at predictable locations nearby the vortices specifically compelled, by virtue of predisposed dimensions of the vortices.

Magnetic field modulation: a change in the density of a magnetic field permeating an area of matter, whereby the change occurs over an interval of time. For example, the formation and dissipation of a vortex will change the magnetic field near where the vortex forms and dissipates. This changing magnetic field over time is a kinetic energy, comprised of a movement of the density of the field, also known as a modulation of the magnetic field, since the field density is moving as time elapses. This may be referred to as field modulation, field density change, movement of magnetic flux, or modulation of the field.

Inductor: an electrical conductor formed such that magnetic field modulation nearby the electrical conductor induces an electric current to flow in the electrical conductor.

The headings provided herein are for convenience only and do not interpret the scope or meaning of the claimed invention.

Overview

A method and apparatus for the generation of electric power and conversion of energy by using electromagnetic induction of the modulation of a magnetic field provided by vortices in a vortex material. According to aspects of the disclosure, vortex materials modulate magnetic flux in a magnetic circuit, in combination with electromagnetic induction, whereby the modulated magnetic flux produces an electromotive force in electrical conductors that can be used to supply electrical energy to devices that require an input of electrical energy.

According to one aspect of the disclosure, the vortex flux generator employs the magnetic field from a magnetic circuit, a vortex material that is known to produce vortices that modulate the magnetic field, and a plurality of interconnected inductors disposed near the location of the vortices, such that the flux modulation of the vortices is converted into electricity, and accumulated into electrical conductors.

According to further aspects, a controller provides the conditions needed to urge the vortex material to form vortices; the vortices then modulate the magnetic field. The controller's function may include a means or collection of means to transfer energy into and out of the vortex material.

The vortices occur at a microscopic level of existence. In order to accumulate a non-zero electric power from the microscopic movement of magnetic flux urged by the vortices, the inductors are manufactured to match the microscopic modulation. Microelectronic manufacturing methods are used to fabricate inductors that include the correct dimensions, position, and to interconnect them. The electrical power produced is comprised of an accumulation of the converted energy of a plurality of vortices that is induced into a plurality of inductors.

The inductors are manufactured with their position and size known in accordance with the design parameters of the manufacturing process. The vortex material produces vortices by virtue of the properties of the vortex material. Therefore, by fabricating a vortex material, the vortices may occur.

According to aspects of the disclosure, to facilitate a correspondence to the location of magnetic flux modulations, the vortices are artificially aligned to the inductors by urging the vortices to form at locations corresponding to the known location of the inductors.

According to further aspects of the disclosure, the controller transfers energy that may include energy from a variety of sources into the apparatus, and removes excess energy that is not converted into electricity. In this energy transfer process, vortices are formed, dissipated and moved, causing electricity to be generated in the inductors.

According to still further aspects of the disclosure, a vortex flux refrigerator is a method and apparatus to refrigerate a compartment using a vortex flux generator together with a heat transfer loop comprised of a heat conduction media and heat exchanger. Heat transferred from the refrigerated compartment is converted to electricity using microcoils by the quench cooling action of the vortex material.

According to one embodiment, a vortex flux generator is operably coupled to the vortex flux refrigerator. Alternatively, the vortex flux generator may be contained within the vortex flux refrigerator. The vortex flux generator includes a method and apparatus that generates electricity by electromagnetic induction, using a magnetic field modulated by the formation, dissipation, and movement of vortices produced by a vortex material such as a type II superconductor. Magnetic field modulation occurs at the microscopic level, facilitating the production of high frequency electric power. Generator inductors are manufactured using microelectronic fabrication and correspond in at least one dimension to the spacing of vortices. According to aspects of the disclosure, the fabrication process establishes the alignment of vortices and generator coils, permitting the electromagnetic induction of energy from many vortices into many coils simultaneously as a cumulative output of electricity. A thermoelectric cycle is used to convert heat energy into electricity.

In one embodiment, the disclosure can be practiced minimally by using a single vortex. According to further embodiments, the invention can be scaled to any size by increasing the quantity of vortices and the quantity of inductors, to comprise a generator suitable to power a broad range of electric power applications. The energy input may include energy from a broad range of energy sources, including renewable energy sources such as solar and geothermal.

Vortex Flux Generator

Referring now to FIG. 1, a vortex flux generator 500 combines vortex materials with magnetic flux modulation to urge an electric current to flow in an inductor using electromagnetic induction. A magnetic circuit is formed using a magnetic core 27 including magnetic powder or amorphous metal with a 0.7 Tesla magnet, or magnets 21 having a permanent magnet or electromagnet inserted in the circuit, yielding a magnetic field denoted by the illustrative field lines 20. A vortex material 24 and inductor array 22 are placed within the magnetic circuit. As shown in FIG. 1, the vortex material 27 and inductor array 22 are adjacent to each other in the magnetic field. The elements of the component labeled "Controller" in FIG. 1 are further detailed with respect to FIG. 11. Electricity Output 200 represents the power output of one embodiment of the disclosure.

Figure 3:
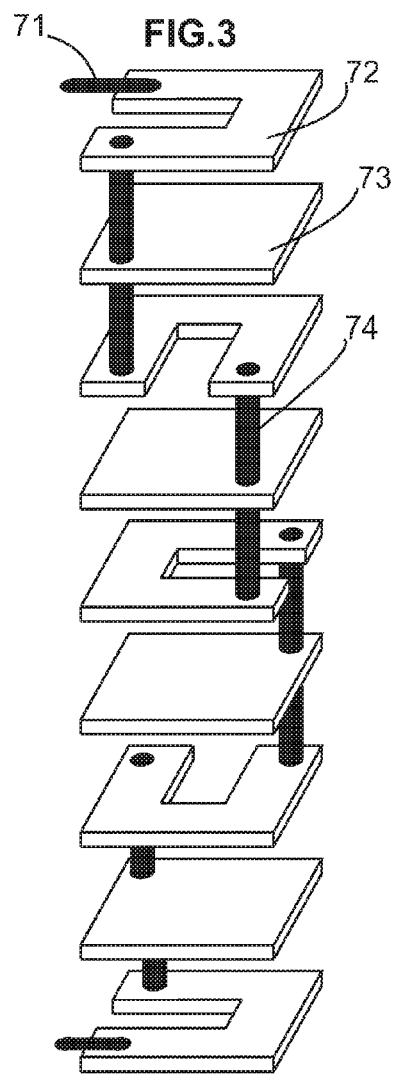
FIG. 3 shows an exploded isometric view of the layered components of an inductor in the vortex flux generator in accordance with aspects of the disclosure.

Referring to FIG. 3, a microscopic inductor is fabricated using microelectronic fabrication. This fabrication process is comprised of a layered microelectronic process analogous to the process currently used to fabricate CMOS integrated circuit chips. The exemplary expanded inductor shown in FIG. 3 is comprised of five layers of copper alloy electrical conductors 72, where the trace width and spacing is fifty five nanometers. Both the trace height of eighty two nanometers, and insulator 73 thickness of ten nanometers, are not proportionally scaled to the thickness of the electrically conductive layer in the illustration. An electrically conductive via 74, through the insulator 73, interconnects the layers of the inductor. As will be appreciated by those skilled in the art, any number of layers of conductors and varying widths and spacing may be employed within the scope of the disclosure.

An electrical interconnect 71 may include a continuation of the trace of the electrical conductor 72. Interconnect 71 may be used to connect to other inductor assemblies. An analogous interconnect, at the bottom-most conductor layer shown, provides the connection for the opposite end of the inductor assembly in FIG. 3.

Figure 4:
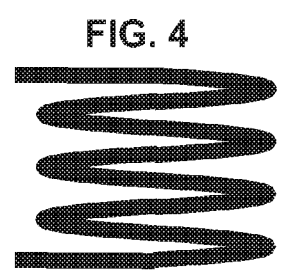
FIG. 4 shows a schematic of a helical coil of electrically conductive matter that is analogous to and may be utilized as the inductor in the vortex flux generator in accordance with aspects of the disclosure.

In the exemplary embodiment, each layer of the electrically conductive material is an arced segment that is not closed upon itself. Each layer includes three-fourths of a turn of an equivalent helical coil. In alternative aspects of the disclosure, a helical coil fabricated from a fifty nanometer diameter wire, depicted in FIG. 4, may be utilized as the inductor.

Figure 3A:
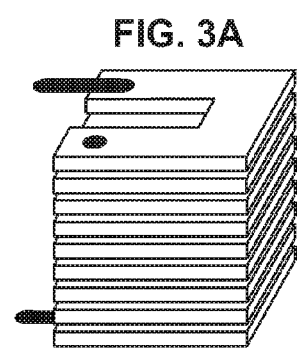
FIG. 3A shows an isometric assembled view of the layered components that an inductor in the vortex flux generator may include, where the layered components of FIG. 3A are illustrated in a manner that is more representative of how these layered components are actually assembled together. Compared to FIG. 3, the components in FIG. 3A are illustrated with a lesser degree of vertical expansion, and more components are hidden by adjacent components in accordance with aspects of the disclosure.

In FIG. 3A, the expansion of the view in FIG. 3 is decreased, forming a more uniform illustration. According to aspects of the disclosure, the inductor assembly of FIG. 3A may include similar components as FIG. 3.

Figure 8:
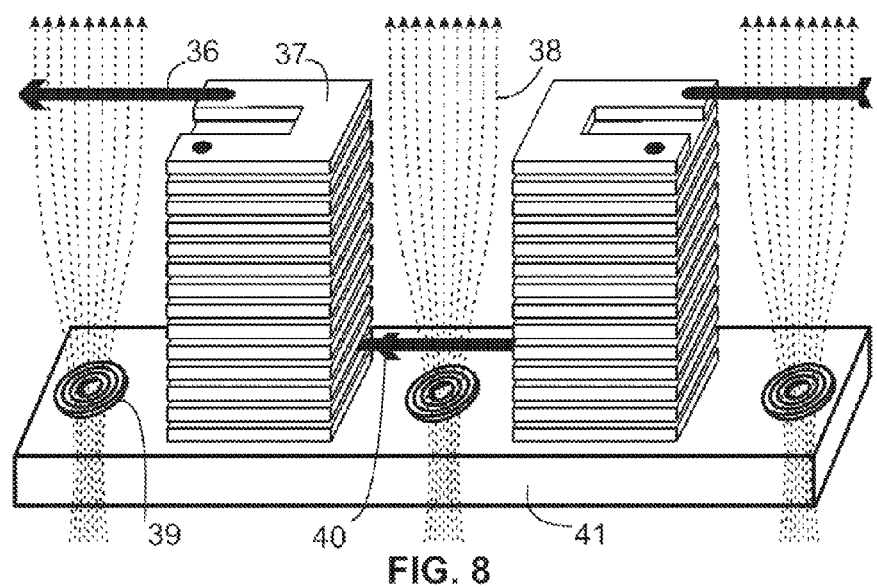
FIG. 8 shows an isometric view that depicts the magnetic flux being modulated by a plurality of vortices, and a plurality of layered inductors analogous to the inductor of FIG. 3A, that are interconnected in series, producing electricity in accordance with aspects of the disclosure.
Figure 10:
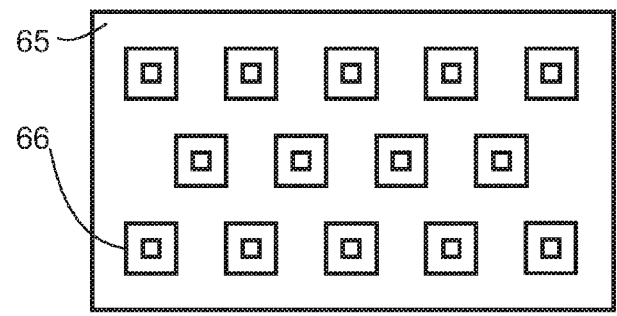
FIG. 10 shows a plan view of the plane of an array of inductors that are manufactured analogous to the inductor of FIG. 3A, in positions that correspond to the urged location of the vortices depicted in FIG. 9B in accordance with aspects of the disclosure.

According to one embodiment and as further shown in FIG. 8, the inductor assembly 37 is comprised of seven layers of an electrical conductor, and seven layers of insulator, including five and one quarter turns of the conductor that includes the inductor, about its central axis. The inductor 37 is an extension of the assembly in FIG. 3A, with more layers, such that the electrical interconnects 36 and trace extension 40 for the assembly exit on opposite sides, facilitating interconnection to the adjacent inductor assembly also shown in FIG. 8, and interconnected with trace extension 40. In FIG. 10, fourteen of these layered inductor assemblies 66 are depicted in an array upon a substrate 65. According to aspects of the disclosure, the substrate 65 may be a one millimeter silicon wafer.

Figure 6:
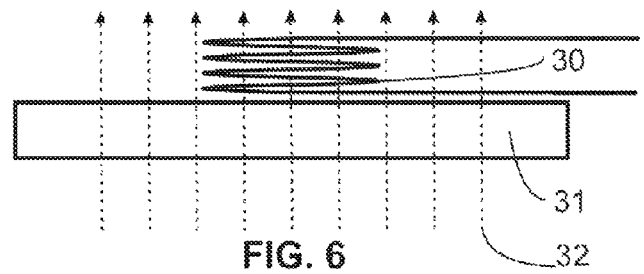
FIG. 6 shows a schematic illustration of a single inductor disposed near a vortex material, wherein a depicted magnetic field density is not modulated by a vortex in accordance with aspects of the disclosure.

Referring to FIG. 6, a single inductor 30 is illustrated. Magnetic flux lines 32 are shown in the state where no vortex is present in a vortex material 31 resulting in negligible current flowing in the inductor 30.

Figure 7:
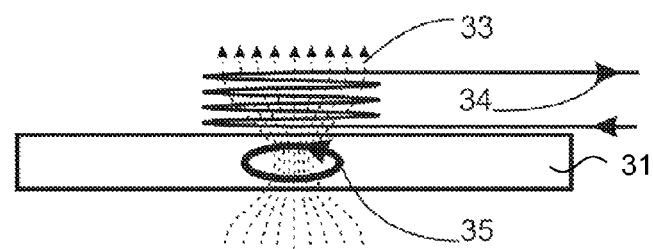
FIG. 7 shows a schematic illustration identified in FIG. 6, with a vortex now present. The vortex is modulating the magnetic flux, and inducing electricity in the inductor in accordance with aspects of the disclosure.

FIG. 7 shows a vortex 35 formed in vortex material 31 and as shown by the illustrative magnetic flux lines, the magnetic field indicated is increasing in density in the vortex 35, and in the adjacent inductor. The increasing magnetic field density is illustrated by 33. While the magnetic field density is increasing in the inductor, electric power flows from the inductor, indicated by the arrow 34. As described herein, when the vortex dissipates, electric power also flows from the inductor, with the current in the opposite direction, according to Lenz's Law.

FIG. 8 illustrates a placement of inductor assemblies 37 in between the location that vortices 39 form from a vortex material 41. Three vortices are shown. By this placement of the inductors, the magnetic flux density decreases in the inductors when the vortices form. This decrease in flux density induces electric power to flow from each of the inductor assemblies. The trace extension 40 connects the two illustrated inductor assemblies shown in series. This connection accumulates the electric power from the inductors. The interconnect 36 may comprise a connection to another inductor, or a connection to a load powered by the Electricity Output 200 of the present invention, shown in FIG. 1 and FIG. 11.

Each of the exemplary inductor assemblies has connector terminals including at least two terminals. The interconnecting conductors between them establish an interconnecting means. Every interconnection results in a fewer number of conductors emanating from the plurality of interconnected inductors so connected. In the exemplary embodiment, millions of inductors may be connected in series, resulting in an accumulation of the electrical power from millions of inductors into a single pair of conductors, thereby providing a fewer number of conductors, by using microelectronic fabrication of an interconnecting means of a plurality of interconnected inductors. A million inductors have at least two million connection terminals, however when interconnected, the million inductors have a result that may include two terminals instead of two million.

Again referring to FIG. 8, during the formation and dissipation of the vortices, the magnetic flux 38 may include an induced electric power in the inductor by the action of the vortex while the vortex is stationary with respect to the inductor and vortex material 41. This is by the increased density of magnetic flux within the vortex as compared to the density of the flux surrounding the vortex.

The electric power induced in the inductor may be induced by an electromagnetic induction comprised of a changing magnetic field with respect to the inductor by a movement of a vortex respectively to the inductor, where the vortex 39 that carries an increased magnetic field density within the vortex moves with respect to the inductor 37. Although a means is deployed to have the vortices form at predetermined positions, vortices may move respectively to the vortex material and inductors by the action of energy in the vortex material. Said energy may include the energy of the electrical current produced by the Quench Control 600 in FIG. 11.

The electric power induced in the inductor may be induced by an electromagnetic induction comprised of a changing magnetic field with respect to the inductor by a displacement of magnetic flux density from one vortex to another. This occurs by the property of the vortices, where an amount of flux in one vortex may displace to other vortices. Although the total of the flux density in all vortices is conserved, the flux passing through an inductor disposed nearby will change, producing electricity in the inductors that encompass the changing flux.

Figure 9A:
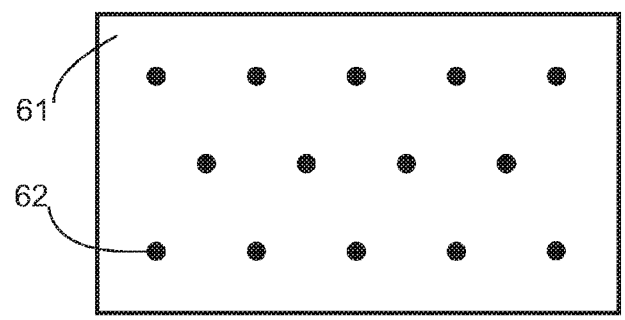
FIG. 9A shows a plan view of a surface plane of the vortex material, depicting the location where a means has been deployed to urge the formation of vortices at particular positions in accordance with aspects of the disclosure.

FIG. 9A depicts a surface plane of the vortex material. In an exemplary embodiment, the vortex material 61 includes layers of materials deposited on a substrate. According to aspects of the disclosure, the vortex material 61 may either begin with the same substrate as the substrate for the inductor array, or utilize its own substrate. If on its own substrate, the substrate used may include a material that has a cryogenic contraction rate analogous to the rate of contraction of the inductor substrate, such that the alignment between the vortices and inductors is maintained across the range of operating temperatures.

According to one aspect, when a separate substrate is used, the substrate for the vortex material chip and the substrate for the inductor array chip may both include for example, a one millimeter silicon wafer.

When fabricating the layers of the vortex material chip, buffer and insulator layers are used, and a Bismuth-based Type II superconductor thin film, for example fifty nanometers thin deep, commonly known as Bi-2223 is deposited, resulting in a smooth surface that will mate with the inductor chip's smoothed surface.

FIG. 9A also depicts the locations where a means to urge vortices to form at predetermined positions is deployed. In the illustrative embodiment shown in FIG. 9A, fourteen such locations 62 are shown. At locations 62, the material may have a change in static magnetic permeability, such as by the deposition of a material at these locations with a different magnetic permeability than the surrounding material, providing a means to urge a gradient in the magnetic field density resulting in a different magnetic field density, and in particular a static gradient change in the magnetic field at location 62, creating formation of a vortex.

Another means to urge vortices to form at predetermined positions may include the actuation of an inductor adjacent to the vortex material, by an electrical current in the inductor, using the inductor as a solenoid electromagnet, thus comprising a means for a dynamic gradient change in the magnetic field, whereby the vortex will form at the location 62, as urged by of the solenoid's magnetic field.

Another means to urge vortices to form at predetermined positions may include a means for a change in the uniformity of the vortex material at predetermined positions. This may include a change in molecular composition in the material, such as by the deposition of molecules that are different from the molecules of vortex material, at the predetermined positions 62.

Another means to urge vortices to form at predetermined positions may include a change in the crystal lattice structure, comprised of a defect or non-uniformity of the lattice at predetermined positions, comprised of a similar molecular formula as the whole, though with different atoms specifically at the predetermined positions 62 in the lattice.

Another means to urge vortices to form at predetermined positions may include a change in dimension of the vortex material at predetermined positionsined positions, such as a change in the thickness of the layers of substrate, buffer or vortex generating molecular regime, such as is used in the exemplary embodiment described below.

In one exemplary embodiment, an etching process is used to change the dimension of the Bi-2223 thin film at locations 62, to establish the locations where vortices will form. This change in dimension is effected by an etching process that is comprised of reducing the depth of the Bi-2223 material, for example, by twenty five nanometers in a half spherical etching cavity that is, for example, twenty five nanometers in diameter, at each location 62.

Figure 9B:
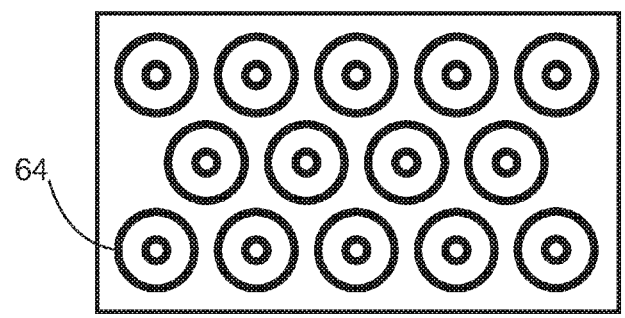
FIG. 9B shows a plan view of a surface plane of the vortex material of FIG. 9A, depicting vortices that have formed at the urged positions in accordance with aspects of the disclosure.

FIG. 9B illustrates the same vortex material as FIG. 9A, where the vortices 64 have formed.

FIG. 10 is an illustration of the corresponding locations of the inductor assemblies that are comprised of a layered construction method detailed in FIG. 3 and FIG. 3A, that are grouped into a matrix, and interconnected to accumulate the electric power induced into them by the modulated flux from the vortices of FIG. 9B.

In the exemplary embodiment, the inductor array substrate 65 of FIG. 10 is assembled adjacent to the vortex material substrate 61 of FIG. 9A, by layering the two substrates upon each other. The result is that the vortices which form at the predetermined positions within the vortex material, that is layered to the inductor array substrate, are formed at positions which correspond to the position of the inductors.

In one exemplary embodiment, the predetermined positions place the vortices three hundred and thirty nanometers apart at their centers, alternatively, the vortices may be further apart or closer together or may be placed at random or irregular intervals. In order to encompass a net changing flux density in the inductors, the length of the segments in the inductors may include a length that is approximately half or less than the distance between the vortices. This establishes at least one predetermined dimension that in the exemplary embodiment is one hundred and sixty five nanometers in length, for the segments of the inductors.

The predetermined positions and dimension are illustrated by the correspondence of the location of vortices and inductors in FIG. 6, FIG. 7, FIG. 8, FIG. 9A, FIG. 9B, and FIG. 10. For illustrative purposes, the figures shown may comprise a scale that is different from the scale of the exemplary embodiment.

Figures 2A, 2B:
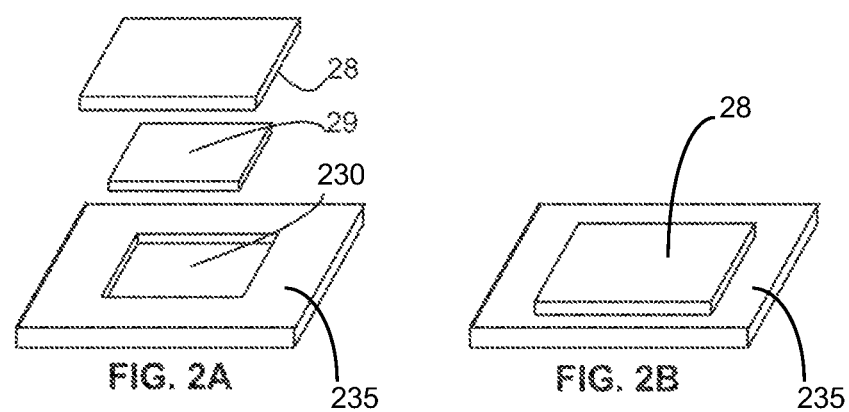
FIG. 2A shows an exploded isometric view of a vortex material chip and the inductor chip sandwiched together with a mounting substrate in accordance with aspects of the disclosure.
FIG. 2B shows an isometric view of the vortex material chip and the inductor chip sandwiched together with a mounting substrate from FIG. 2A, where the sandwiched chips are mounted to the mounting substrate, and one of the sandwiched chips is concealed inside the recess of the mounting substrate in accordance with aspects of the disclosure.

Referring to FIG. 2A, in the exemplary embodiment, the inductor array is comprised of one billion interconnected inductor assemblies on a chip 28, with an area of one centimeter square. In FIG. 2A, the substrate of the inductor array chip 28 is facing up. The vortex material chip 29, on its own substrate, has its substrate facing down.

These two chips 28 and 29 of FIG. 2A are mounted to each other with the substrates facing outward, and the inductors and superconductor films separated by insulation layers comprised of one hundred nanometers total thickness from all mating surfaces.

In FIG. 2B, the two sandwiched chips from FIG. 2A are installed into the substrate, such that the chip 29 of FIG. 2A, now attached to chip 28, is concealed beneath chip 28 in the illustration of FIG. 2B, inside the substrate cavity 230 of FIG. 2A.

Figure 5:
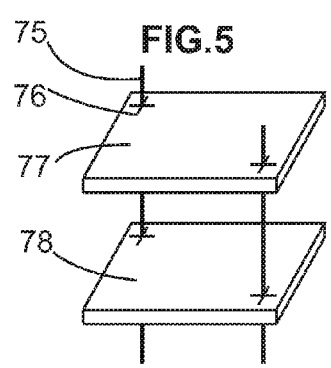
FIG. 5 shows an exploded isometric view of an alignment means used to align layered components in the vortex flux generator in accordance with aspects of the disclosure.

Referring to FIG. 5, the two layers 77 and 78 correspond to the two chips 28 and 29 of FIG. 2A, in this particular example. FIG. 5 depicts the usage of an alignment means to ensure the corresponding placement of the vortex locations and inductor locations using perpendicular references 75, and alignment marks 76 manufactured into each chip 77 and 78, wherein the alignment marks correspond to the placement of the elements of each respective chip to be aligned.

The two layers, 77 and 78, used in this generalized alignment means of the FIG. 5 illustration, may also refer to the alignment of individual layers, rather than specific chips.

The chips aligned and attached to each other using the aforesaid alignment method, are mounted into a substrate 235 with a cavity 230 of FIG. 2A. The cavity 30 provides a recess into which the chip 29 will be contained after being mounted to chip 28. The result is that the larger chip 28 appears on the top of the substrate 235, and this result is shown in FIG. 2B. This resulting aligned chip sandwich includes the vortex material 24, and inductor array 22, both of FIG. 1, inserted into the magnetic circuit 27.

The Bismuth based superconductor used as the source of the vortices in the vortex material chip operates at cryogenic temperatures, as a superconductor, in the magnetic field of the magnetic circuit. It can be quenched out of the superconducting state by an application of additional energy including nuclear energy, electromagnetic energy, thermal energy, modulation of the magnetic field or an electric current. When quenched, the vortices dissipate. These forms of energy may also comprise energy that provides the energy converted into electricity by the present invention. The energy that is the source of the converted energy, and the energy that performs the quenching, may include at least one of these, or a plurality of these.

A Bi-2223 superconductor thin film can be rapidly quenched with a modest electrical current when a static magnetic field is already present, as in the case of the present invention.

Figure 11:
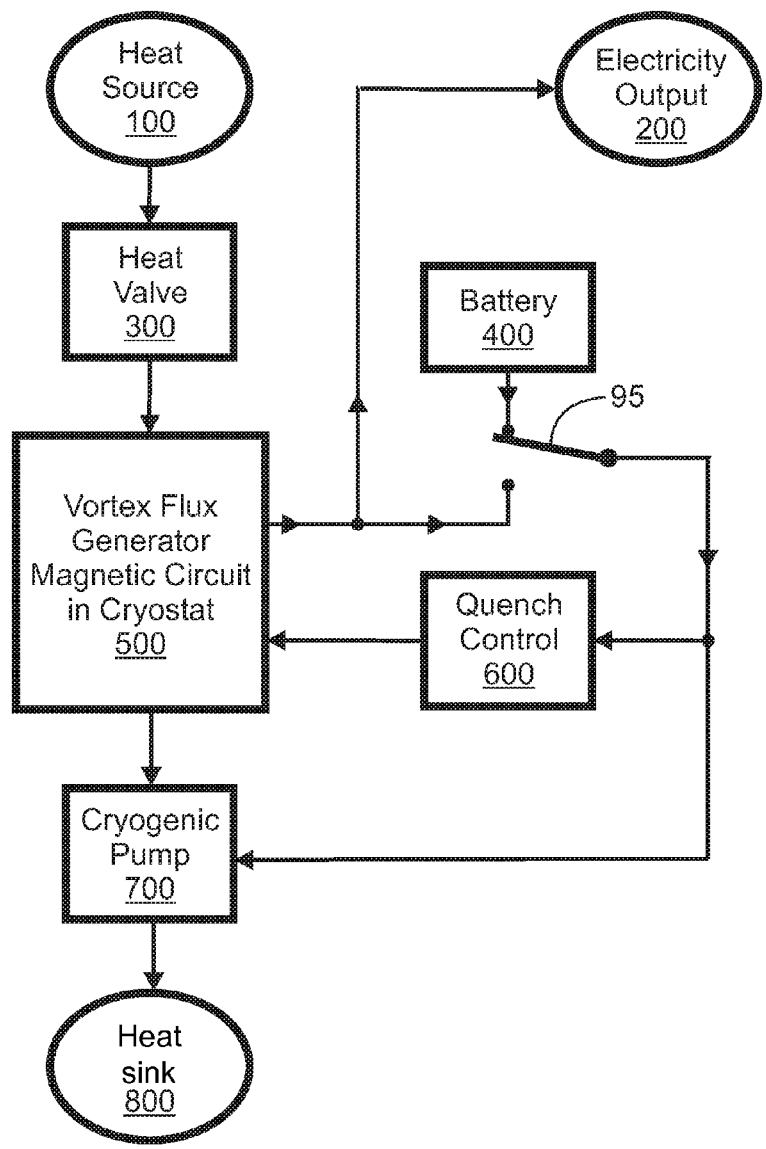
FIG. 11 shows a schematic illustration of the vortex flux generator depicting the elements of the control system, energy source, sink and output in accordance with aspects of the disclosure.

Referring to FIG. 11, in an exemplary embodiment, a quench control circuit 600 applies a pulse of electric current to the vortex material. The current used is ten times the nominal half ampere quenching current, applied as a high speed current pulse via Quench Control circuit 600, as a one hundred nanosecond, five ampere quenching pulse. This quenches the vortex material within 500, dissipating vortices. Feedback may be utilized by Quench Control 600 to modulate the quenching pulse, while utilizing minimal electric energy, such that the net Electricity Output 200 is maximized.

Although a vortex material in the present invention may include one that is a re-entrant vortex material, a non-re-entrant vortex material, and a vortex material which is controlled by a means of stimulation nearby the vortex material, in the case of the exemplary embodiment, the controller of FIG. 1, exploded into detail within FIG. 11, supplies an means of external stimulation, via the pulsed current, to operate the vortex material in a cyclical re-entrant mode.

When the vortex material quenches, heat energy is transferred to the energy of the increased disorganization of the vortex material. That is, the vortices were more organized, and when the vortices dissipated, the vortex material becomes less organized. Heat energy is used in the vortex material to effect the change in organization. Since the vortex material is not operated adiabatically, instead of its temperature simply lowering, heat energy is transferred into the vortex material, whereby the vortex material effectively absorbs heat energy from its operating environment, especially through the heat valve 300. The actual action is that the heat energy transfers from the warmer heat valve 300 to the vortex material.

Energy supplied to the present invention may include heat energy by heat source 100, as modulated by heat valve 300. The present invention requires a sufficient flow of energy to provide for the energy needed to be converted to electricity output 200, plus the energy that is output at heat sink output 800, plus the energy needed by self conversion to power the quench control 600 and cryogenic pump 700 when switch 95 is not in the battery 400 position.

After cessation of the quenching current pulse, and absorbing energy from the source, the Bi-2223 material, still below its superconducting temperature threshold Tc, will be in the superconducting state, and vortices are again formed, flux is modulated, and electricity generated in the inductor array chip within 500. Vortex formation, quenching, vortex dissipation, energy absorption, together with generation of electricity by electromagnetic induction from magnetic field modulation, are the cycles of the method of the present invention.

In the process to dissipate vortices by a pulsed electric current in the exemplary embodiment, and transfer heat energy into the vortex material, more than one form of energy was involved in the cycles of the method of the present invention, comprised of the energy of an electric current, and heat energy.

With the aforementioned chip construction and magnetic field strength, and operating at a cycle rate of one MHz, the usable Electricity Output for the system is ten watts, with an energy input that may include, for example, 10.1 watts. The system may be scaled upward, and the cycle rate increased to provide correspondingly higher output capacities.

The vortex flux generator in an exemplary embodiment is used as a thermoelectric converter, with an intermediate phase of magnetic field modulation. Energy from the Heat Source 100 is converted into Electricity Output 200. Heat energy, which may include waste heat, is removed via the cryogenic pump 700 to the heat sink 800. Heat sink 800 represents a cumulative output of all energy dispersed from the heat source that is not output in any other path. Heat sink 800 may include a sink at a lower temperature than heat source 100.

Battery 400 is enabled via switch 95 to start the process, supplying electric power to run the cryogenic pump 700, and the quench control 600. After the cyclical energy generation operation begins, and the heat energy source is used as the energy input for the system, switch 95 may select that a portion of the electrical output of the generator 500 be used to power the quench control 600 and cryogenic pump 700, rather than use the battery.

Vortex Flux Refrigerator

According to further aspects of the disclosure, a vortex flux refrigerator is a method and apparatus to refrigerate a compartment using a vortex flux generator together with a heat transfer loop including a heat conduction media and heat exchanger. Heat transferred from the refrigerated compartment is converted to electricity using micro-coils by the quench cooling action of the vortex material.

According to one embodiment, the vortex flux generator may be operably coupled to the vortex flux refrigerator. Alternatively, the vortex flux generator may be contained within the vortex flux refrigerator. The vortex flux generator includes a method and apparatus that generates electricity by electromagnetic induction, using a magnetic field modulated by the formation, dissipation, and movement of vortices produced by a vortex material such as a type II superconductor. Magnetic field modulation occurs at the microscopic level, facilitating the production of high frequency electric power. Generator inductors are manufactured using micro-electronic fabrication and correspond in at least one dimension to the spacing of vortices. According to aspects of the disclosure, the fabrication process establishes the alignment of vortices and generator coils, permitting the electromagnetic induction of energy from many vortices into many coils simultaneously as a cumulative output of electricity. A thermoelectric cycle is used to convert heat energy into electricity.

Figure 12:
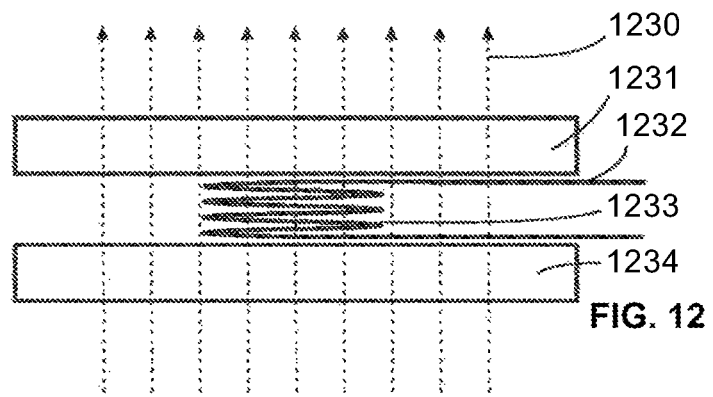
FIG. 12 shows a schematic illustration of a single inductor disposed between vortex material, wherein a depicted magnetic field density is not modulated by a vortex in accordance with aspects of the disclosure.
Figure 13:
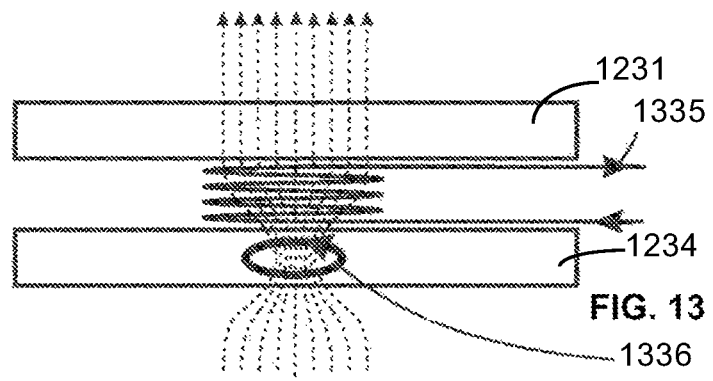
FIG. 13 shows a schematic illustration identified in FIG. 13, with a vortex now present in one of the vortex materials. The vortex is modulating the magnetic flux, and inducing electricity in the inductor in accordance with aspects of the disclosure.
Figure 14:
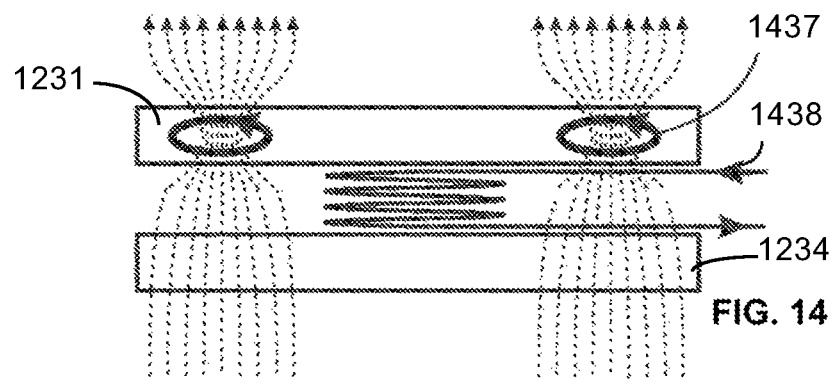
FIG. 14 shows an isometric view that depicts the magnetic flux being modulated by a plurality of vortices in accordance with aspects of the disclosure.

Referring now to FIGS. 12, 13 and 14, FIG. 12 shows a view of a microscopic assembly which may include magnetic field lines 1230, vortex material 1231 which is one side of a sandwich, vortex material 1234 which is the opposite side of the sandwich, inductor 1233 which is sandwiched between vortex materials 1231, 1234, electrically conductive interconnect 1232 which transports the electric current to and from the inductor, current flowing in a first direction 1335, vortex 1336 formed in vortex material 1234, vortex 1437 formed in vortex material 1231, and current 1438 flowing in a direction opposite the first direction.

The inclusion of opposing vortex materials that actively utilize vortices to both increase and decrease the magnetic field density in the inductor is selected according to particular implementation's design parameters, since the field will return to a state of a different field density within the inductor if both were not included. In more detail, this allows that a vortex material may be disposed that increases the field density in the inductor, or a vortex material may be disposed that decreases the field density in the inductor, or a vortex material may be disposed that both increases and decreases the field density in the coil.

Depicted in FIG. 12, no vortex is formed and no current is flowing in the inductor. In FIG. 13, a formed vortex increases the magnetic field density within the inductor, inducing a current to flow. In FIG. 14, the vortex of FIG. 13 has dissipated and vortices form in the opposite side vortex material, which decreases the magnetic field density within the inductor, thereby inducing a current to flow in the direction that is the opposite of the current in the prior FIG. 13.

Figure 15:
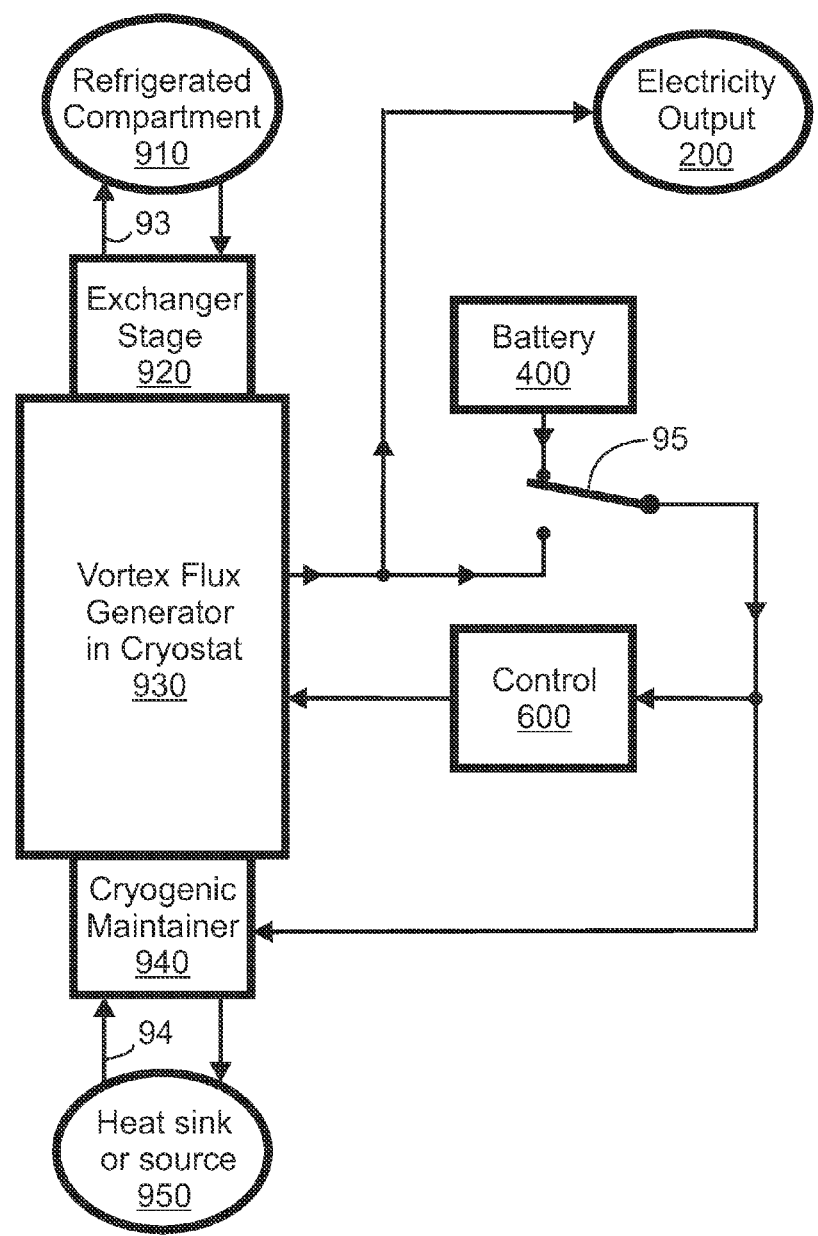
FIG. 15 shows a schematic illustration of the vortex flux refrigerator depicting the elements of the vortex flux generator, refrigerated compartment, control system, energy source, sink and output in accordance with aspects of the disclosure.

Diagram FIG. 15 is an illustrative view of the major component assemblies of the vortex flow refrigerator which includes some titles and further detail as follows. Bidirectional heat flow 93 transfers heat via heat conduction media and exchanger out of the refrigerated compartment 910, and transfers cooled heat conduction media into the refrigerated compartment 910. Bidirectional heat flow 94 establishes and maintains the operating temperature range in vortex flux generator 930 using cryogenic maintainer 940 and heat sink or source 950. Switch 95 provides a means to operate the electric stimulus and power within the vortex flux refrigerator system either from battery 400 or from the electrical output of the vortex flux generator.

Figure 16:
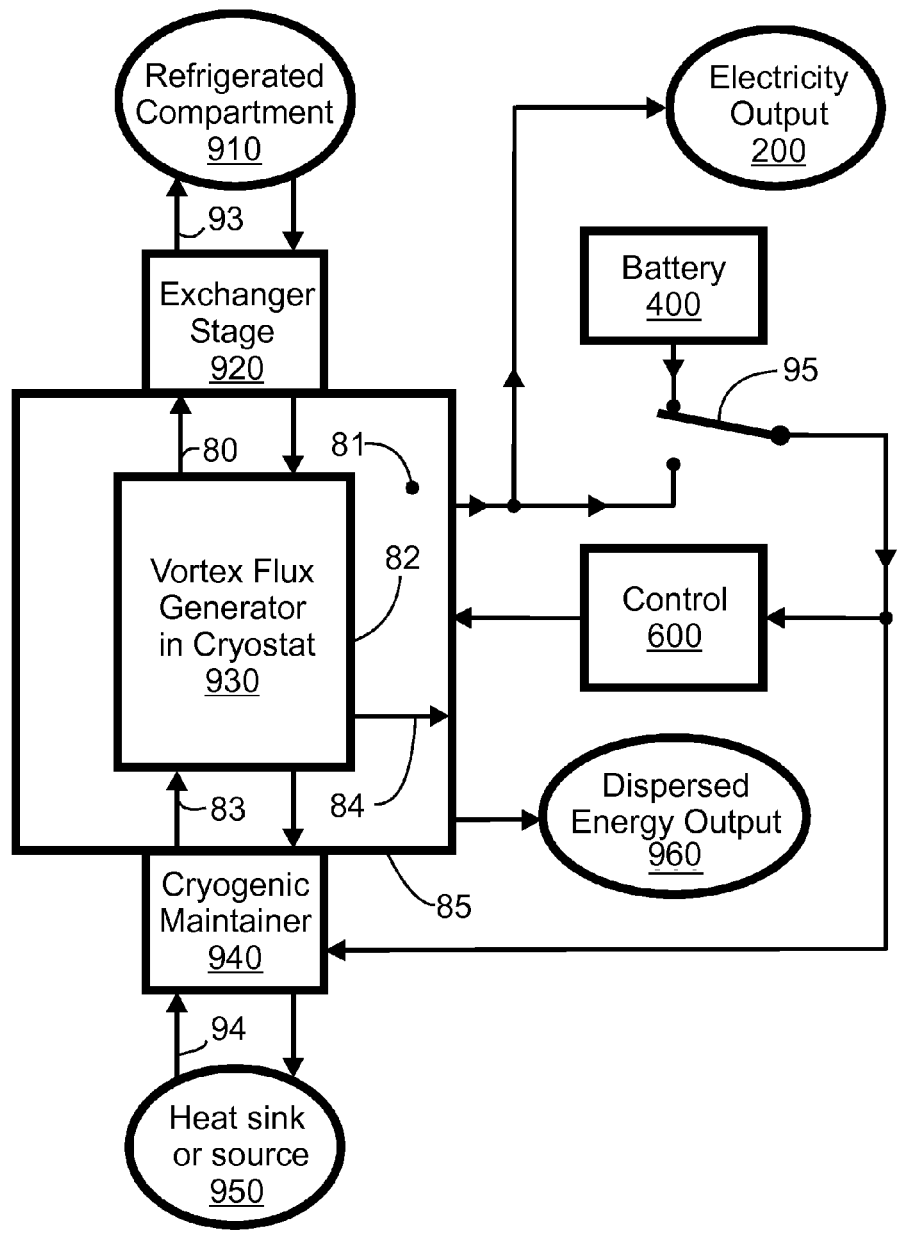
FIG. 16 shows a schematic illustration of the vortex flux refrigerator depicting the elements of the vortex flux generator, refrigerated compartment, control system, energy source, sink and output in accordance with further aspects of the disclosure.

Diagram FIG. 16 is an illustrative view of the major component assemblies of an alternative vortex flow refrigerator which includes some titles and further detail as follows. For the use herein, 'thermal energy,' includes generally the electromagnetic band known as blackbody radiation. Non-thermal energy includes all other bands of energy, such as RF, visible, x-ray, gamma, and the like. According to aspects of the disclosure, 'internal engine' generally refers to where in the system that the thermoelectric cycle process takes place. According to further aspects of the disclosure, 'external surface' of the engine generally refers to the outside of the cryostat.

As further shown in FIG. 16, bi-directional liquid nitrogen fluid flow 80 transfers heat via heat conduction media and exchanger. The transfer may be by stainless steel tubing or other suitable fluid conduits to an exchanger stage 920 and/or vortex flux generator 930. According to aspects of the embodiment, insulation 81 may be provided between the internal engine and external engine surface. Insulation 81 may include, for example, an evacuated chamber. A real or virtual delineation 82 may be provided between the internal engine and the insulation, i.e. inner chamber of the vortex flux generator in cryostat. Bi-direction liquid nitrogen heat exchanger establishes and maintains the operating temperature range in fluid flow 83 between vortex flux generator 930 using cryogenic maintainer 940. In an alternative embodiment, the cryogenic maintainer 940 might be the same unit as the exchanger stage 920. As shown in FIG. 16, energy 84 that is dispersed from the internal engine is comprised primarily of energy that is non-thermal, for example, RF energy. Thermal or non-thermal energy may be transferred to dispersed energy output 960 for storage, further processing, or for immediate reuse.

As further depicted in FIG. 16, an external surface of engine 85 may further interact with components of the system. For example, the external surface may be an RF shield that converts some RF energy to thermal energy which disperses to the dispersed energy output 960.

In a minimal configuration, the vortex flux generator cryostat is itself the refrigerated compartment, utilizing the vortex flux generator's thermoelectric effect, heat exchanger and heat source to maintain the operating temperature of the vortex flux generator while the electric output 200 powers a load. Expanded configurations include additional heat exchangers and separate or additional refrigerated compartments.

According to aspects of the disclosure, the vortex flux refrigerator is comprised of a vortex flux generator with vortex material and inductors fabricated on the same substrate, and vortex materials fabricated such they can both increase and decrease the field density in the inductors.

Superconducting heat valves used to regulate the transfer of heat in and out of the vortex flux generator are comprised of a superconductor material switched in and out of the superconducting state by temperature and/or electro-magnetic quenching. The valve is a heat insulator in the superconducting state, and conducts heat more rapidly in the non-superconducting state.

The vortex flux generator operates as a thermoelectric converter using the quench induced cooling of the type II superconductor which is used as the vortex material. An electric output is generated by modulation of the magnetic field in the inductors by the vortices. Fabricated etching is used to change the dimension of the superconductor thin film, to establish the position where vortices are predisposed to form.

Inductors are fabricated using layered microelectronic fabrication including a conductive material. Inductors are aligned with the predisposed location of vortex formation by the alignment of the fabricated layers upon the substrate.

The refrigerated compartment is also a heated fluid storage tank within a solar heated fluid system. One exemplary fluid is antifreeze, however, other appropriately matched fluids or gases including helium, Freon, water and the like may be used. Refrigeration consists of the transfer of heat via the heat conduction media into the vortex flux generator cryostat, and the transfer of the cooled media back to the heated fluid storage tank. In effect, the vortex flux generator cryostat and the solar heat storage tank are both refrigerated compartments from the cooling of the cyclically quenched vortex material.

According to one embodiment, heat conduction media includes nitrogen and antifreeze. As will be appreciated by one skilled in the art, numerous heat conduction media may be used within the scope of the disclosure. Heat exchangers are all of the heat conducting surfaces that are in contact with the heat conducting media, including materials also comprised of stainless steel or other metals, ceramics and metal alloys in contact with the heat conducting media.

One method of operation disclosed herein includes a method of operating a heat engine such that the electromagnetic energy dispersed from the internal engine traverses a thermal insulator, said thermal insulator permits dispersion of non-thermal electromagnetic energy from the internal engine system to the space outside the internal engine, permitting an operating temperature of the dispersing external surface of the engine that is arbitrary when compared to the temperature of the heat source.

The above description of illustrated embodiments, including what is described in the Abstract, is not intended to be exhaustive or to limit the invention to the precise forms disclosed. Although specific embodiments and examples are described herein for illustrative purposes, various equivalent modifications can be made without departing from the spirit and scope of the invention, as will be recognized by those skilled in the relevant art. The teachings provided herein of the invention can be applied to vortex manipulation in combination with electricity generation and/or refrigerated compartments and not necessarily the exemplary combinations generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all combinations that operated in accordance with the claims. Accordingly, the invention is not limited by the disclosure, but instead its scope is to be determined entirely by the following claims.

I claim:

1. A vortex flux refrigerator comprising:
    a vortex flux generator comprising:
        a magnetic circuit configured to produce a magnetic field,
        a vortex material, disposed within the magnetic field and configured to form and subsequently dissipate a vortex, wherein upon formation of the vortex, a magnetic field density surrounding the vortex is urged to decrease, and wherein upon subsequent dissipation of the vortex, the urging to decrease ceases and the magnetic field density increases prior to a reformation of the vortex, wherein the decrease of the magnetic field density and the increase of the magnetic field density correspond to a modulation of the magnetic field, and
        an inductor disposed in a vicinity of the vortex such that the modulation of the magnetic field induces an electrical current in the inductor; and
    a refrigerated compartment operatively coupled to the vortex flux generator, the refrigerated compartment comprising a heat transfer loop including a heat conduction media and a heat exchanger.

2. The vortex flux refrigerator of claim 1, wherein the vortex material is configured to form and subsequently dissipate a plurality of vortices, wherein the inductor comprises a plurality of inductors, wherein each of the plurality of inductors is disposed in a vicinity of one of the plurality of vortices.

3. The vortex flux refrigerator of claim 2, further comprising a plurality of interconnects configured to electrically couple the plurality of inductors and accumulate the electrical currents induced therein.

4. The vortex flux generator of claim 3, wherein each of the plurality of inductors has at least one predetermined dimension such that the electrical currents accumulated via the plurality of interconnects have a magnitude greater than zero.

5. The vortex flux generator of claim 2, wherein the vortex material is configured to form and subsequently dissipate the plurality of vortices at respective predetermined positions within the vortex material.

6. The vortex flux generator of claim 5, wherein the vortex material is configured to form and subsequently dissipate the plurality of vortices at respective predetermined positions within the vortex material within the vicinity of a corresponding inductor.

7. The vortex flux generator of claim 5, wherein the vortex material is configured to form and subsequently dissipate the plurality of vortices at positions within the vortex material having a gradient in the magnetic field density or a change in the uniformity of the vortex material.

8. The vortex flux generator of claim 7, wherein the gradient in the magnetic field density comprises a static gradient change or a dynamic gradient change.

9. The vortex flux generator of claim 7, wherein the change in the uniformity of the vortex material comprises a change in the dimension of the vortex material, a change in a molecular composition of the vortex material, or a change in a crystal lattice structure of the vortex material.

10. The vortex flux generator of claim 1, wherein the vortex material comprises a superconducting material.

11. The vortex flux generator of claim 1, wherein the inductor comprises a microelectronically fabricated inductor.

12. The vortex flux generator of claim 1, further comprising a controller configured to control the formation and the dissipation of the vortex in the vortex material.

13. The vortex flux generator of claim 12, wherein the controller comprises a controller configured to control a transfer of energy into and out of the vortex material.

14. The vortex flux generator of claim 13, wherein the energy comprises at least one selected from a group comprising: thermal conduction, electrical current, electromagnetic energy, nuclear energy, and magnetic field modulation energy.

* * * * *